United States Patent
Kuzuyama

(10) Patent No.: US 8,096,279 B2
(45) Date of Patent: Jan. 17, 2012

(54) PREMIXED COMPRESSION IGNITION TYPE ENGINE AND METHOD OF CONTROLLING THE SAME

(75) Inventor: Hiroshi Kuzuyama, Kariya (JP)

(73) Assignee: Kabushiki Kaisha Toyota Jidoshokki, Aichi-ken (JP)

(*) Notice: Subject to any disclaimer, the term of this patent is extended or adjusted under 35 U.S.C. 154(b) by 238 days.

(21) Appl. No.: 12/516,244

(22) PCT Filed: Oct. 30, 2007

(86) PCT No.: PCT/JP2007/071443
§ 371 (c)(1),
(2), (4) Date: May 26, 2009

(87) PCT Pub. No.: WO2008/065856
PCT Pub. Date: Jun. 5, 2008

(65) Prior Publication Data
US 2010/0043745 A1    Feb. 25, 2010

(30) Foreign Application Priority Data
Nov. 30, 2006  (JP) ................................ 2006-322913

(51) Int. Cl.
F01L 1/344 (2006.01)
F02B 3/12 (2006.01)

(52) U.S. Cl. ...................... 123/295; 123/294; 123/90.15
(58) Field of Classification Search .................. 123/294, 123/295, 90.15–90.18
See application file for complete search history.

(56) References Cited

U.S. PATENT DOCUMENTS

| | | | | |
|---|---|---|---|---|
| 7,703,434 B2 * | 4/2010 | Sloane et al. | ................. | 123/299 |
| 7,730,870 B2 * | 6/2010 | Michelini et al. | ............ | 123/295 |
| 2008/0066713 A1 * | 3/2008 | Megli et al. | .................... | 123/295 |

FOREIGN PATENT DOCUMENTS

| | | |
|---|---|---|
| EP | 1496231 A1 | 1/2005 |
| JP | 05-106411 A | 4/1993 |
| JP | 10-018826 A | 1/1998 |
| JP | 2000-220458 A | 8/2000 |
| JP | 2004-293458 A | 10/2004 |
| WO | 2005/059340 A1 | 6/2005 |
| WO | 2006/007954 A1 | 1/2006 |

OTHER PUBLICATIONS

International Search Report issued on Feb. 14, 2008, for International Application No. PCT/JP2007/071443.

* cited by examiner

Primary Examiner — Erick Solis
(74) Attorney, Agent, or Firm — Locke Lord LLP

(57) ABSTRACT

A premixed compression ignition type engine is operated while change over between spark ignition combustion and compression ignition combustion. This engine has a negative overlap period during steady operation under compression ignition combustion. In the same cylinder, a valve-closing timing of an exhaust valve during steady operation under spark ignition combustion is retarded with respect to the valve-closing timing thereof after the change over. In a case where an intake valve is first changed over after start of the change over from spark ignition combustion to compression ignition combustion, the valve-opening timing of the intake valve during a change over period from spark ignition combustion to compression ignition combustion is in an advanced state with respect to the valve-opening timing thereof during steady operation under spark ignition combustion.

10 Claims, 11 Drawing Sheets

PREMIXED COMPRESSION IGNITION TYPE ENGINE AND METHOD OF CONTROLLING THE SAME

FIELD OF THE INVENTION

The present invention relates to a premixed compression ignition type engine that operates while change over between spark ignition combustion and compression ignition combustion, and a method of controlling the engine.

BACKGROUND OF THE INVENTION

A premixed compression ignition type engine that is operated while changing over between spark ignition (sometimes referred to as SI) combustion and compression ignition (sometimes referred to as HCCI or homogeneous charge compression ignition) combustion is controlled, for example, under the control method disclosed in Japanese Patent Application Laid Open No. 2000-220458, or No. 2004-293458.

In JP2000-220458, the ignition timing of the engine is retarded to make compression ignition precede spark ignition in making a changing over from spark ignition combustion to compression ignition combustion, so the transition to compression ignition combustion is made reliably and smoothly. As the ignition timing is thus retarded gradually, the pressure generated during combustion, namely, output such as torque decreases gradually. Therefore, the amplitude of fluctuation in torque (torque step) can be held small, and the change over to compression ignition combustion can be made with a low output. Accordingly, this control method makes it possible to cause a drop in in-cylinder temperature and suppress combustion noise and the like resulting from pre ignition or knocking during a change over period from spark ignition combustion to compression ignition combustion.

SUMMARY OF THE INVENTION

Problems to be Solved by the Invention

Here, in the case of a multi-cylinder engine, camshafts serving to open/close exhaust valve and intake valve are used commonly for all cylinders. Therefore, the timing for a change over between spark ignition combustion and compression ignition combustion (i.e., the timing for changing over between cams for spark ignition combustion and cams for compression ignition combustion) is usually designated as a timing common to all cylinders. On the other hand, in the case of a multi-cylinder engine, the valve timing of the exhaust valve and the intake valve in each cylinders are shifted from one another and hence differ.

FIG. 7 is a chart showing valve timing according to two patterns (i.e., patterns 1 and 2) in a conventional multi-cylinder engine. Although only the two patterns are illustrated in FIG. 7, the number of patterns may become three or more depending on the number of cylinders.

For example, in the case where a change over point from spark ignition combustion to compression ignition combustion is a timing corresponding to a compression stroke after the end of an intake stroke during spark ignition combustion (which is defined as pattern 1, see FIG. 7) in a certain one of the cylinders, a change over to valve timing of compression ignition combustion is made when the exhaust valve is opened next time (the change over is made from the exhaust valve, that is, the exhaust valve is first changed over), so an operation at valve timing having a negative overlap period is performed without problems after the change over in that cylinder. The control method disclosed in JP2000-220458 functions effectively in a cylinder having the aforementioned valve timing (according to pattern 1).

Meanwhile, other cylinders may operate at another valve timing. In the case where the above-mentioned common change over point is a timing corresponding to an exhaust stroke (timing at which the exhaust valve is open) (which is defined as pattern 2, see FIG. 7), a change over to the valve timing of compression ignition combustion is made when the intake valve is opened next time (the change over is made from the intake valve, that is, the intake valve is first changed over). In this case, the exhaust valve that is open at the change over point operate at valve timing of spark ignition combustion, namely, normal valve timing (valve timing in a combustion cycle with the valve-closing timing of the exhaust valve before the change over from spark ignition combustion to compression ignition combustion (during steady operation under spark ignition combustion) retarded with respect to the valve-closing timing of the exhaust valve after the change over (during steady operation under compression ignition combustion, see (A) of FIG. 7)). The intake valve, which is opened subsequently, operate at the valve timing of compression ignition combustion, namely, valve timing (late-open timing) having a negative overlap period (with the valve timing during steady operation). In the cylinder having the valve timing according to this pattern, when a change over is made from spark ignition combustion to compression ignition combustion, the exhaust valve is closed in the neighborhood of compression top dead center and the intake valve is opened late.

As disclosed in JP 2004-293458, in a compression ignition type engine, when exhaust valve is closed at normal valve timing (in the neighborhood of compression top dead center) and intake valve is opened late (see FIG. 1(a) of JP 2004-293458), an "intake air heating effect" is produced. That is, the suction of intake air is started when the pressure in a combustion chamber becomes negative, so the intake air flows into the combustion chamber swiftly and is heated efficiently due to an adiabatic compression effect (see (B) of FIG. 7). Thus, compression ignition combustion is carried out efficiently. Those valve timings are identical to the valve timings in the above-mentioned "other cylinders." Therefore, the intake air heating effect is also produced during a change over period in the other cylinders having the valve timing according to the aforementioned pattern 2.

This intake air heating effect can be utilized when high-temperature internal EGR is not obtained, for example, when the engine is started. However, the influence of the intake air heating effect is too strong during normal operation, so abnormal combustion such as pre ignition or knocking occurs during the change over period in each of the cylinders having such valve timing that the change over is made from the intake valve as described above. Therefore, in each of the cylinders having the valve timing as described above (according to pattern 2), the occurrence of pre ignition or knocking cannot be easily suppressed simply by retarding the ignition timing at the time of the change over, so the aforementioned control method disclosed in JP2000-220458 does not function effectively.

It is therefore an object of the present invention to provide a premixed compression ignition type engine and a method of controlling the same which make it possible to suppress the occurrence of pre ignition or knocking during a period of change over from spark ignition combustion to compression ignition combustion even when the change over is made starting from the intake valve.

Means for Solving the Problems

In order to achieve the above-mentioned object according to the present invention, a method of controlling a premixed compression ignition type engine that includes at least one cylinder, a combustion chamber, an intake valve, and an exhaust valve that is operated while changing over between spark ignition combustion and compression ignition combustion, the method including: performing opening/closing control of the intake valve and the exhaust valve to set a negative overlap period in which the exhaust valve is closed earlier and the intake valve is opened later with respect to compression top dead center during steady operation under the compression ignition combustion; performing control to retard valve-closing timing of the exhaust valve before a change over from the spark ignition combustion to the compression ignition combustion with respect to the valve-closing timing of the exhaust valve after the change over in the same cylinder; and performing control to advance valve-opening timing of the intake valve with respect to the valve-opening timing thereof during steady operation under the compression ignition combustion in a case where the intake valve is changed over first after start of the change over from the spark ignition combustion to the compression ignition combustion.

A premixed compression ignition type engine according to the present invention includes a plurality of cylinders having at least two different kinds of valve timing, a combustion chamber, an intake valve, and an exhaust valve, in which: the exhaust valve is changed over first after the start of the change over from spark ignition combustion to the compression ignition combustion in a case of one of the two kinds of valve timing; and the intake valve is changed over first after the start of the change over from the spark ignition combustion to the compression ignition combustion in a case of the other of the two kinds of valve timing. Such a premixed compression ignition type engine is controlled by the above-mentioned control method.

In the present invention, the negative overlap period refers to a period in which both the exhaust valve and the intake valve are closed in the neighborhood of exhaust top dead center. In this case, the exhaust valve is closed before exhaust top dead center is reached.

A premixed compression ignition type engine controlled under the aforementioned method of controlling the premixed compression ignition type engine has a plurality of cylinders with at least two different kinds of valve timing. With one of the two kinds of valve timing, the exhaust valve is first changed over after the start of change over from spark ignition combustion to compression ignition combustion. With another of the two kinds of valve timing, the intake valve is changed over first after the start of change over from spark ignition combustion to compression ignition combustion. In this premixed compression ignition type engine having a plurality of cylinders, there are two patterns, namely, a pattern according to which the change over is made starting from the exhaust valves and a pattern according to which the change over is made starting from the intake valves. By employing this premixed compression ignition type engine, the occurrence of pre ignition or knocking during the change over period can be suppressed.

DETAILED DESCRIPTION OF THE PREFERRED EMBODIMENTS

A preferred embodiment of the present invention will be described hereinafter with reference to the drawings. In the following description, the term "change over point" refers to a timing corresponding to the start of change over from spark ignition combustion to compression ignition combustion. The term "start of the change over" refers to a timing when a change over signal for making a change over from valve lift control during spark ignition combustion to valve lift control during compression ignition combustion is sent out. The term "change over period" refers to a period from a moment when the change over is started to a moment when a state of steady operation under compression ignition combustion is entered. The expression "at the time of the change over" refers to a time period around the change over point. The term "valve-open timing" refers to a time point at which the opening of a valve is started.

(Overall Construction)

Figure 1:
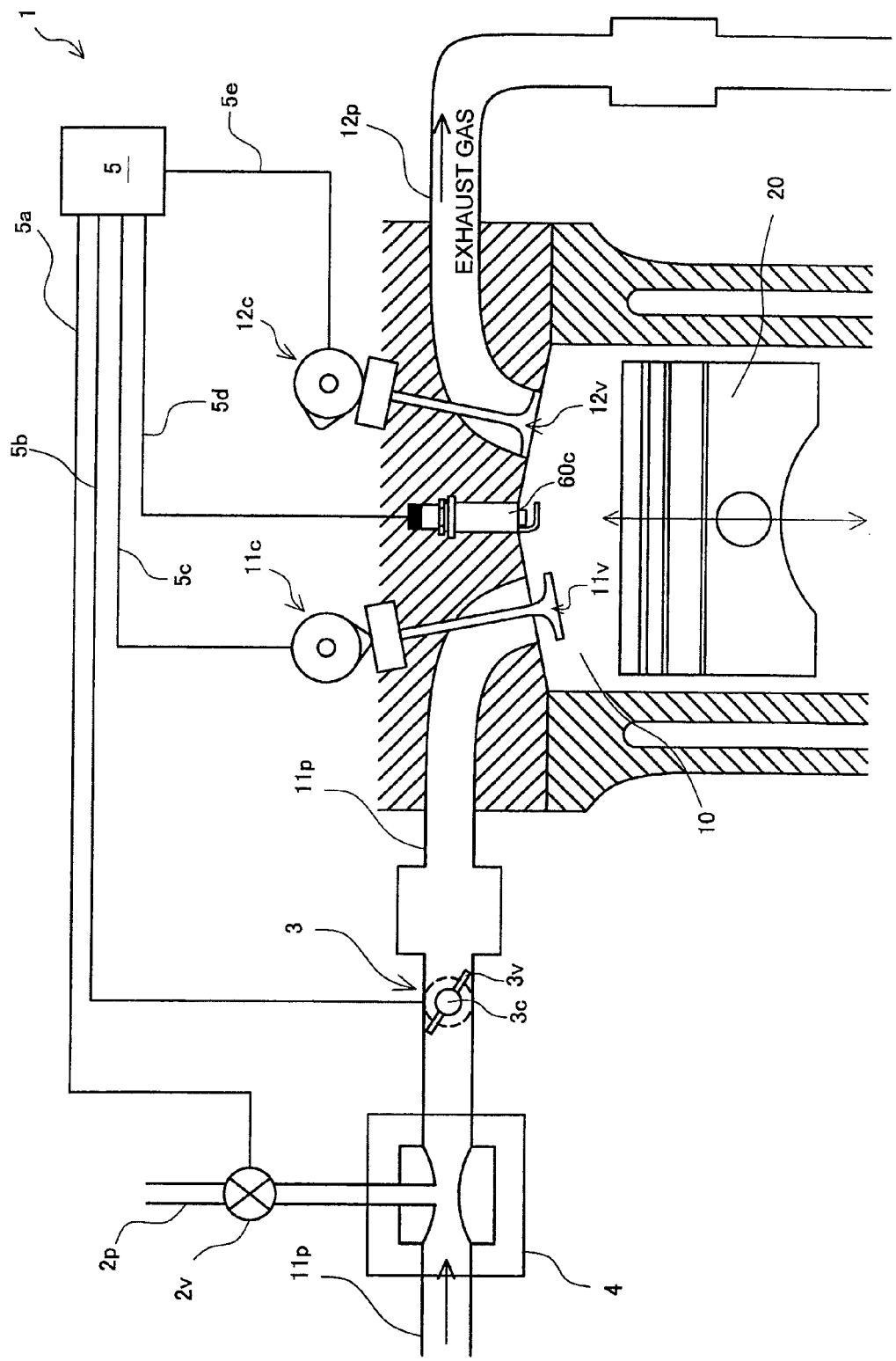
FIG. 1 is a diagram showing an overall construction of a single cylinder of a premixed compression ignition type engine according to an embodiment of the present invention.

First of all, the overall construction of a premixed compression ignition type engine according to the embodiment of the present invention will be described with reference to FIG. 1. FIG. 1 shows the overall construction of the premixed compression ignition type engine according to the embodiment of the present invention including one cylinder.

In this embodiment of the present invention, a premixed compression ignition type engine 1 has four cylinders arranged in series. Those cylinders are referred to as first cylinder, second cylinder, third cylinder, and fourth cylinder, respectively, according to the order of arrangement. FIG. 1 illustrates one of those cylinders (first to fourth cylinders are identical in construction). The first to the fourth cylinders have different combustion cycles, and the valve timing of the first to the fourth cylinders is shifted from one another by a crank angle of 90°. The number of cylinders is also not limited to four.

As shown in FIG. 1, the premixed compression ignition type engine 1 has a combustion chamber 10, an intake port 11p leading to the combustion chamber 10, an intake valve 11v, an exhaust valve 12v, and an exhaust port 12p. The premixed compression ignition type engine 1 changes over suitably between spark ignition combustion and compression ignition combustion in accordance with operating conditions (load and engine speed). By making the change over between compression ignition combustion and spark ignition combustion in accordance with the operating conditions as described above, both low fuel consumption resulting from compression ignition combustion and high output resulting from spark ignition combustion can be achieved.

The premixed compression ignition type engine 1 has a mixture portion 4 across which the intake port 11p extends. A fuel is supplied to the mixture portion 4 through a fuel supply passage 2p. The fuel is then mixed with air in the mixture portion 4. While a gaseous fuel such as LPG, Butane, or Propane, may be used as the fuel, a fuel other than the gaseous fuel on the above such as gasoline or the like may also be used as the fuel. Employed as the mixture portion 4 is, to be specific, a mixer (in the case of a gaseous fuel), a carburetor, or the like.

The premixed compression ignition type engine 1 is constructed with a throttle 3 and a fuel valve 2v. In addition, the premixed compression ignition type engine 1 has an ECU 5 (Electronic Control Unit). The fuel valve 2v, the throttle 3, the intake valve 11v, an ignition plug (ignition device) 60c, and the exhaust valve 12v are electrically connected to the ECU 5 via control cables 5a to 5e, respectively. The ECU 5 is common to the first to the fourth cylinders. The ECU 5 is designed to control the operations of the fuel valve 2v, the throttle 3, the intake valve 11v, the ignition plug 60c, and the exhaust valve 12v.

The ECU 5 controls the operations of cam lobes 11c and 12c (via control of the camshafts), thereby opening/closing the intake valve 11v and the exhaust valve 12v. Although illustrated in a simplified manner in FIG. 1, a variable valve timing mechanism is employed in the embodiment of the present invention as will be described later, so the valve opening/closing timing of the intake valve 11v can be changed suitably. In the embodiment of the present invention, as will be described later, a variable valve operating mechanism is also employed. More specifically, each of the cam lobes 11c and 12c is constructed with a low-lift cam with a small lift amount for compression ignition combustion and a high-lift cam with a large lift amount for spark ignition combustion (only the one located on the front side is illustrated in FIG. 1). A change over between the low-lift cam and the high-lift cam is made in accordance with operating conditions to change the valve lift amount and the valve opening/closing timings of each of the intake valve 11v and the exhaust valve 12v (e.g., techniques disclosed in JP H05-106411 and JP H10-18826 are adopted).

As shown in FIG. 1, the throttle 3 is constructed with a shaft 3c and a valve portion 3v. The ECU 5 controls the throttle 3 to adjust the opening degree of the valve portion 3v. The amount of intake air supplied to the combustion chamber 10 through the intake port 11p is thereby adjusted. The fuel valve 2v is provided such that the fuel supply passage 2p extends thereacross. The ECU 5 controls the fuel valve 2v to adjust the opening degree thereof. The amount of the fuel supplied to the intake port 11p is thereby adjusted.

(Description of Variable Valve Timing Mechanism)

Figure 10:
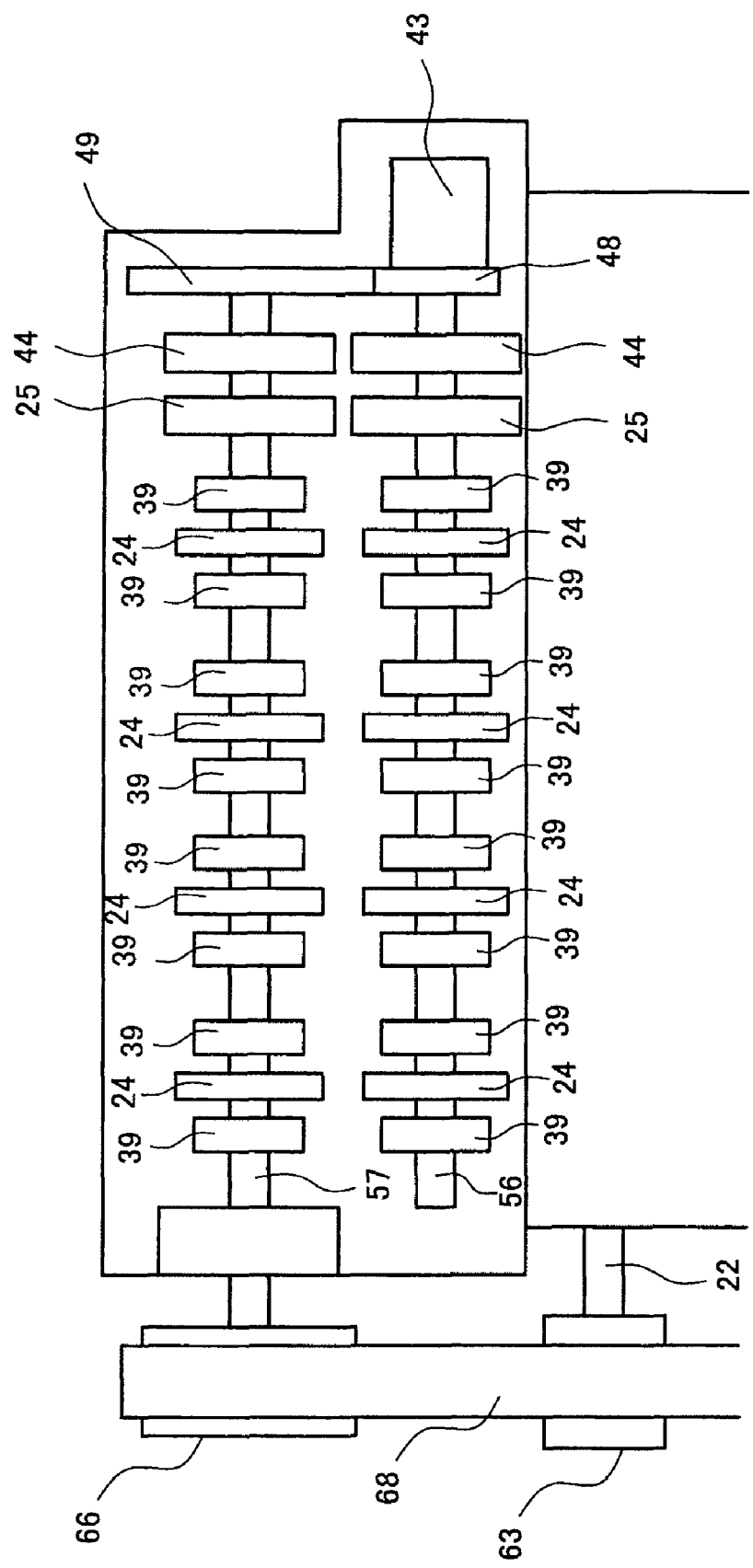
FIG. 10 is a schematic diagram showing a variable valve timing mechanism in the premixed compression ignition type engine according to an embodiment of the present invention.

The outline of the variable valve timing mechanism according to the embodiment of the present invention will be described with reference to the schematic diagram of FIG. 10. In a cylinder head of the premixed compression ignition type engine 1, an exhaust-side camshaft 57 for driving exhaust valves and an intake-side camshaft 56 for driving intake valves are provided adjacent to each other. A timing belt (chain) 68 is wound around between an exhaust cam pulley 66 provided at one end of the exhaust-side camshaft 57 and a crank pulley 63 provided at one end of a crankshaft 22. In addition, a driving gear 49 mounted at the other end of the exhaust-side camshaft 57 is meshed with a driven gear 48 mounted at an end of the intake-side camshaft 56. Then, through rotation of the crankshaft 22, the exhaust-side camshaft 57 is rotationally driven via the crank pulley 63, the timing belt 68, and the exhaust cam pulley 66, and the intake-side camshaft 56 is rotationally driven via the driving gear 49 and the driven gear 48.

The driven gear 48 is provided with a variable valve timing device (VVT) designed to shift the driven gear 48 with respect to the driving gear 49 in an axial direction. Due to a shift of the driven gear 48 in the axial direction resulting from the operation of the VVT, the rotational phase of the intake-side camshaft 56 is shifted, so the valve opening/closing timing of the intake valves 11v in each of the cylinders are changed suitably. It should be noted that this construction is illustrated schematically, and that the present invention should not be limited thereto.

Owing to the aforementioned construction of the variable valve timing mechanism, the intake-side camshaft 56 and the exhaust-side camshaft 57, which serve to perform advancement/retardation control of the valve timing, are each common to the four cylinders of the premixed compression ignition type engine 1. Therefore, the advancement/retardation control of the valve timing affects all the cylinders. For example, when an attempt to advance the valve timing of the intake valve in a certain one of the cylinders is made, the valve timing of the intake valves in all the cylinders is advanced. The camshafts 56 and 57 are used for both spark ignition combustion and compression ignition combustion. Therefore, advancement/retardation for spark ignition combustion in a certain one of the cylinders affects other cylinders which are in compression ignition combustion, and vice versa.

(Description of Variable Valve Operating Mechanism)

Figure 11:
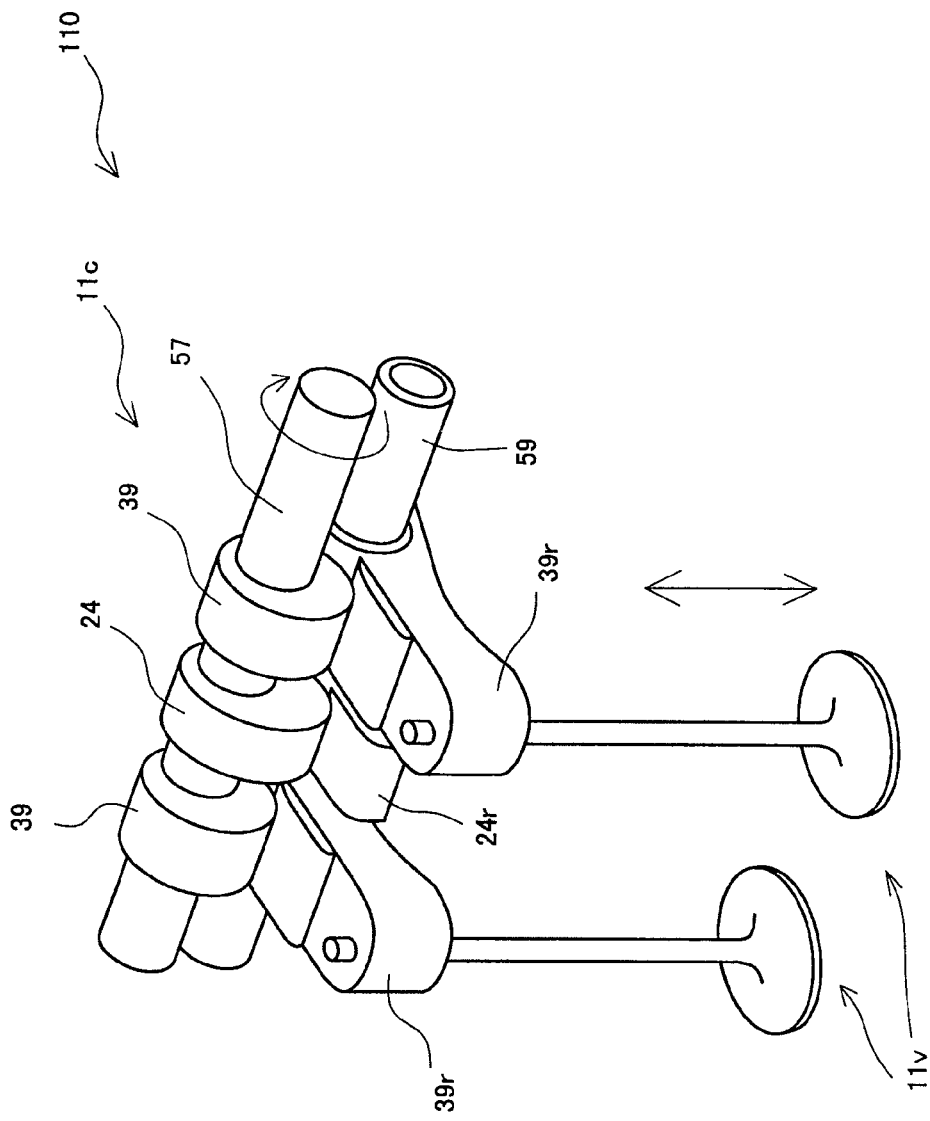
FIG. 11 is a perspective schematic diagram showing the construction of a variable valve operating mechanism in the premixed compression ignition type engine according to the embodiment of the present invention.

Next, the construction of the variable valve operating mechanism will be described with reference to FIG. 11. FIG. 11 is a perspective schematic diagram showing the variable valve operating mechanism according to the embodiment of the present invention. Although the cam 11c for intake valves 11v will be described with reference to FIG. 11, the cam 12c for exhaust valves 12v is also constructed in the same manner.

A variable valve operating mechanism 110 is constructed so as to allow the valve opening/closing timing or the valve lift amount of the intake valves 11v to be changed over suitably between two stages, namely, low lift (for compression ignition combustion) and high lift (for spark ignition combustion). A support (not shown) for supporting a rocker shaft 59 is mounted onto the cylinder head, and low-lift rocker arms 39r and a high-lift rocker arm 24r are arranged in alignment with each other and rockably mounted onto the rocker shaft 59 for each of the cylinders. The low-lift rocker arms 39r rock in a vertical direction of FIG. 11 through rotation of low-lift cam lobes 39 with a small working angle or a small lift amount. The intake valves 11v (or exhaust valves 12v) are opened/closed as the low-lift rocker arms 39r rock. The high-lift rocker arm 24r rocks in the vertical direction of FIG. 11 through rotation of a high-lift cam 24 with a large working angle or a large lift amount. The low-lift rocker arms 39r can be coupled to or decoupled from the high-lift rocker arm 24r when appropriate.

More specifically, during compression ignition combustion, the high-lift rocker arm 24r is decoupled from the low-lift rocker arms 39r. Accordingly, while the high-lift rocker arm 24r idly rocks (which does not affect the lift of intake valves 11v) through rotation of the high-lift cam 24, the low-lift rocker arms 39r rock through rotation of the low-lift cams 39. As a result, the intake valves 11v are opened/closed with valve timing for low lift and a valve lift amount for low lift.

During spark ignition combustion, the high-lift rocker arm 24r is coupled to the low-lift rocker arms 39r. Accordingly, the high-lift rocker arm 24r and the low-lift rocker arms 39r rock integrally through rotation of the high-lift cam 24, so the intake valves 11v are opened/closed at the valve timing and valve lift amount for high lift. Although, the variable valve operating mechanism having the two low-lift cams and the single high-lift cam is illustrated in FIG. 11, the present invention is not limited to this construction.

(Description of Valve Lift Properties During Spark Ignition Combustion and Compression Ignition Combustion)

Figure 4:
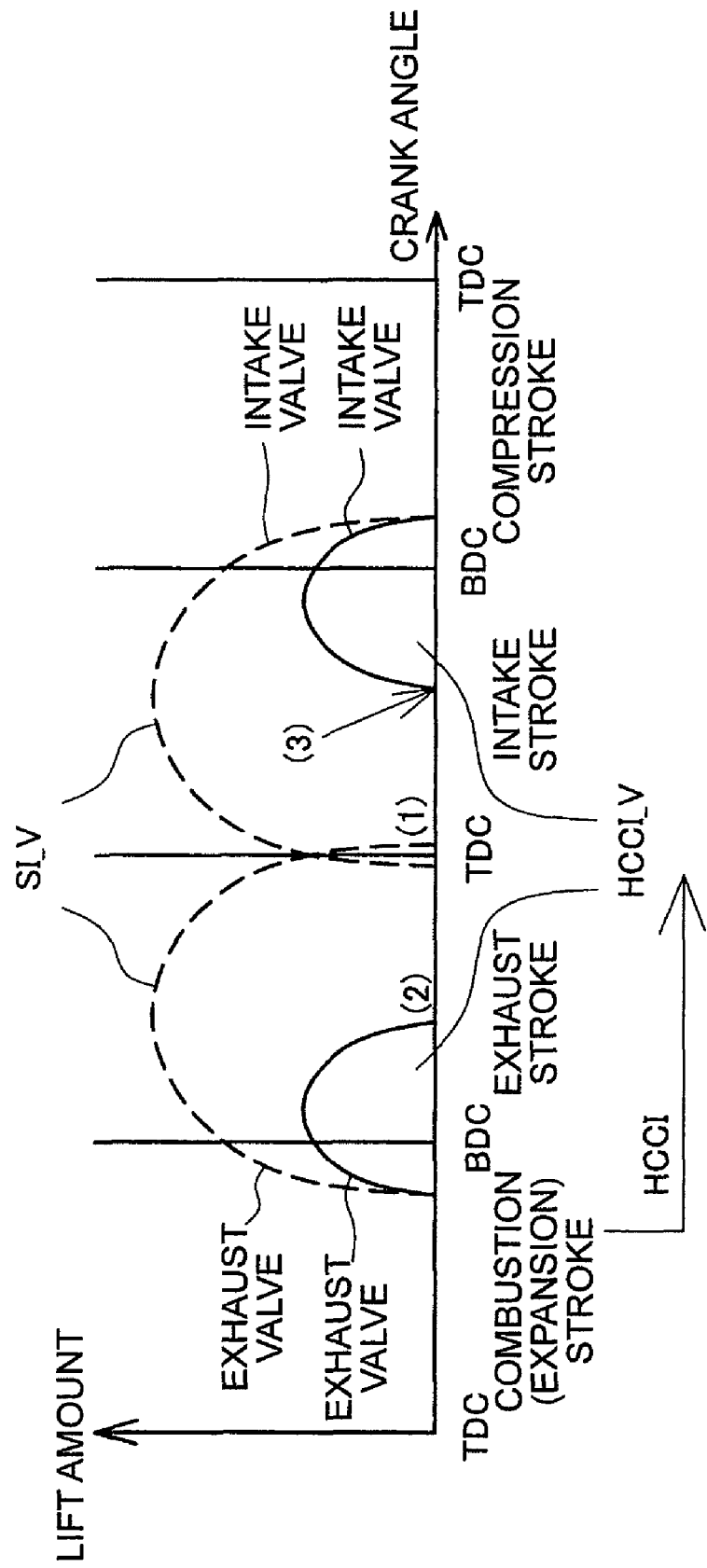
FIG. 4 is a schematic diagram showing valve lift properties in the case of pattern 1 immediately after the start of change over in the premixed compression ignition type engine of FIG. 1.

FIG. 4 is a schematic diagram showing valve lift properties (amount and timing) during steady operation. FIG. 4 shows periodic valve lift properties within each combustion cycle during spark ignition combustion and compression ignition combustion in the same cylinder. Referring to FIG. 4, each valve lift property during spark ignition combustion is denoted by "SI_V", and each valve lift property during compression ignition combustion is denoted by "HCCI_V". In FIG. 4, the axis of abscissa represents crank angle. On the assumption that one period (one combustion cycle) includes four strokes, that is, combustion, exhaust, intake, and compression, the intake valve 11v and the exhaust valve 12v operate with periodic valve lift properties in this combustion cycle.

As shown in FIG. 4, the premixed compression ignition type engine 1 has respective valve lift amount and valve timing for spark ignition combustion (SI) and compression ignition combustion (HCCI). Thus, during spark ignition combustion or compression ignition combustion, both the exhaust valve 12v and the intake valve 11v are opened/closed with a predetermined one of the valve lift properties (amount and timing) (see FIG. 4). During steady operation under compression ignition combustion, the premixed compression ignition type engine 1 operates such that the intake valve 11v and the exhaust valve 12v have a negative overlap period. That is, there is a period in which both the exhaust valve 12v and the intake valve 11v are closed in the neighborhood of exhaust top dead center, and the exhaust valve 12v is closed before exhaust top dead center is reached (see FIG. 4). With this configuration, the premixed compression ignition type engine 1 carries out compression ignition combustion with the aid of internal EGR. By setting the negative overlap period and utilizing internal EGR as described above, an improvement in ignitability during compression ignition combustion is achieved.

On the other hand, in the same cylinder of the premixed compression ignition type engine 1, the valve closing timing of the exhaust valve 12v in case of steady operation under spark ignition combustion (see (1) of FIG. 4) is retarded with respect to the valve closing timing of the exhaust valve 12v in case of steady operation under compression ignition combustion (see (2) of FIG. 4) (see (A) of FIG. 3, which will be described later). That is, in a corresponding combustion cycle, the valve-closing timing of the exhaust valve 12v before a change over from spark ignition combustion to compression ignition combustion is retarded with respect to the valve-closing timing of the exhaust valve 12v after the change over. During steady operation under spark ignition combustion, the exhaust valve 12v operates at normal valve timing (so does intake valve 11v). The expression "in a corresponding combustion cycle" means that a comparison is made with periodic valve lift properties during compression ignition combustion and periodic valve lift properties during spark ignition combustion illustrated in an overlapping manner as shown in FIG. 4 (comparison is made in the same combustion cycle).

(Description on Pattern of Combustion Cycle in Each Cylinder)

The first to the fourth cylinders of the premixed compression ignition type engine 1 have different valve timing (according to four patterns). The expression "different valve timing" means that the valve timing is shifted from one another (each by 90°) as described above, but the period of valve timing (period of combustion cycle) remains unchanged among the cylinders. In the case of one of two kinds of valve timing (which is referred to as pattern 1), the exhaust valve 12v is first changed over after the start of a change over from spark ignition combustion to compression ignition combustion. In the case of the other of the two kinds of valve timing (which is referred to as pattern 2), the intake valve 11v is first changed over after the start of a change over from spark ignition combustion to compression ignition combustion (although exhaust valve 12v is already open at a change over point). In the embodiment of the present invention, the third cylinder is set so as to operate at the valve timing according to pattern 1, and the second cylinder is set so as to operate at the valve timing according to pattern 2, respectively. In explaining the timing of the "valve-opening timing" citing the intake valve 11v during compression ignition combustion of FIG. 4 as an example, the valve-opening timing of the intake valve 11v corresponds to the time point indicated by an arrow (3).

(Description on Valve Timings According to Patterns 1 and 2)

Figure 3:
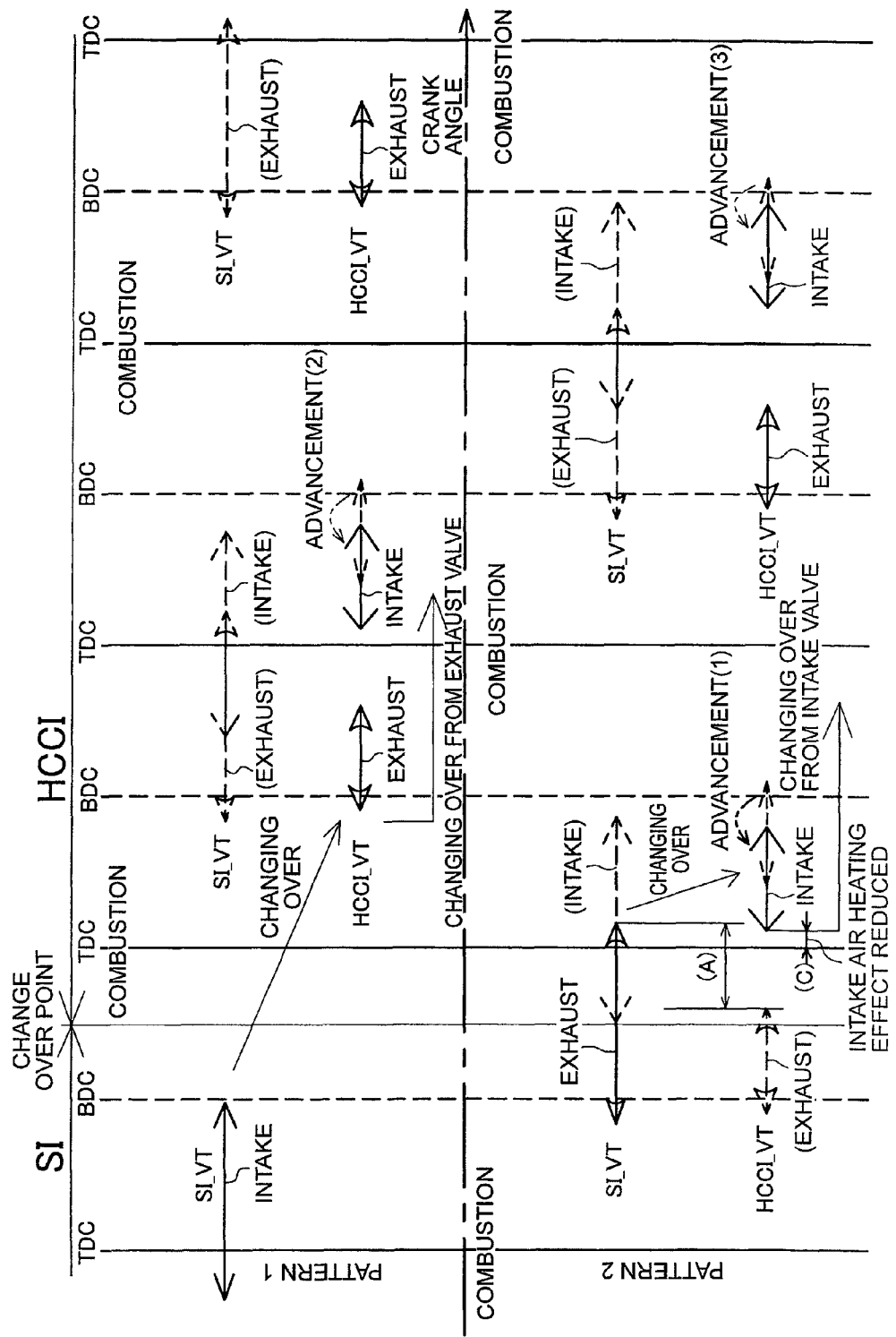
FIG. 3 is a chart showing valve timing according to two patterns, namely, patterns 1 and 2 in the premixed compression ignition type engine of FIG. 1.

FIG. 3 is a chart showing valve timing according to the two kinds of patterns in the premixed compression ignition type engine 1 according to the embodiment of the present invention. The upper part of FIG. 3 represents the valve timing according to pattern 1, and the lower part of FIG. 3 represents the valve timing according to pattern 2. For each of patterns 1 and 2, the upper region represents the valve timing of spark ignition combustion (SI), and the lower region represents the valve timing of compression ignition combustion (HCCI). As described above, pattern 1 indicates the valve timing of the third cylinder, and pattern 2 indicates the valve timing of the second cylinder. The axis of abscissa of FIG. 3, which represents crank angle, is common to patterns 1 and 2. That is, referring to FIG. 3, a "change over point" is a timing common to patterns 1 and 2, and represents a timing where a change over signal is sent out by the ECU 5. The change over point represents a timing for "start of change over". The change over signal is a signal serving to make a change over from valve lift control during spark ignition combustion to valve lift control during compression ignition combustion in each of the cams 11c and 12c under the control of the variable valve operating mechanism 110. In FIG. 3, TDC and BDC represent top dead center and bottom dead center, respectively, and compression top dead center corresponds to each timing of "COMBUSTION". The valve timing of FIG. 3 indicates periods in which the valves are open (in operation or lifted).

During operation, either the cams for spark ignition combustion or the cams for compression ignition combustion are used due to a change over therebetween, under the control of the variable valve operating mechanism 110. Therefore, while some of the cams are in use, the other cams are out of use. Solid line segments of FIG. 3 indicate the valve timing in using the cams that are in use. Broken lines of FIG. 3 indicate the valve timing in using the cams that are out of use. Referring to FIG. 3, the words "INTAKE" and "EXHAUST" are parenthesized for the valve timings of the cams that are out of use.

In the case of pattern 1, the change over point from spark ignition combustion to compression ignition combustion is a timing corresponding to a compression stroke following the end of an intake stroke under spark ignition combustion. A change over to valve timing and valve lift properties for compression ignition combustion is made when the exhaust valve 12v is opened next time (the change over is made starting where the exhaust valve 12v or the exhaust valve 12v is first changed over). That is, after the start of the change over under the control of the variable valve operating mechanism 110, the low-lift cams (for compression ignition combustion) first function with the cams for exhaust. In the third cylinder operating according to pattern 1, the operation at the valve timing having the negative overlap period is performed without problems after the start of the change over (see pattern 1 of FIG. 3). In the embodiment of the present invention, the expression "first changed over" is explained as an indication that "the cams are changed over by the variable valve operating mechanism 110". However, the present invention should not be limited to this mode. That is, the expression "first changed over" may indicate that "the timing for opening/closing the valves is changed by the variable valve timing mechanism". This expression may also bear both the aforementioned meanings.

Referring to FIG. 4, solid lines indicate valve lift properties (amount and timing) in the third cylinder immediately after the start of the change over in the case of pattern 1. As shown in FIG. 4, according to pattern 1, a change over in valve timing from spark ignition combustion to compression ignition combustion is made starting from the exhaust valve 12v. Therefore, the exhaust valve 12v and the intake valve 11v start being opened/closed at the valve timing for compression ignition combustion immediately after the start of the change over (although the lift timing of the intake valve immediately after the start of the change over is, strictly speaking, advanced with respect to the lift timing thereof during steady operation as will be described later, this advancement is not illustrated in FIG. 4).

On the other hand, in the case of pattern 2, as shown in FIG. 3, the above-mentioned change over point is a timing corresponding to an exhaust stroke, and a change over to the valve timing and the valve lift properties for compression ignition combustion is made when the intake valve 11v is opened next time (the change over is made from the intake valve 11v, that is, the intake valve 11v is first changed over). That is, after the start of the change over under the control of the variable valve operating mechanism 110, the low-lift cams (for compression ignition combustion) first function from the cams for intake. Before the change over (to the low-lift cams) is made, the exhaust valve 12v is opened/closed by the cam for spark ignition combustion, so the exhaust valve 12v operates at the normal valve timing (see the solid lines of FIG. 3). Then, immediately after the change over (to the low-lift cams), the intake valve 11v is opened/closed by the cam for compression ignition combustion (see the solid lines of FIG. 3).

Figure 5:
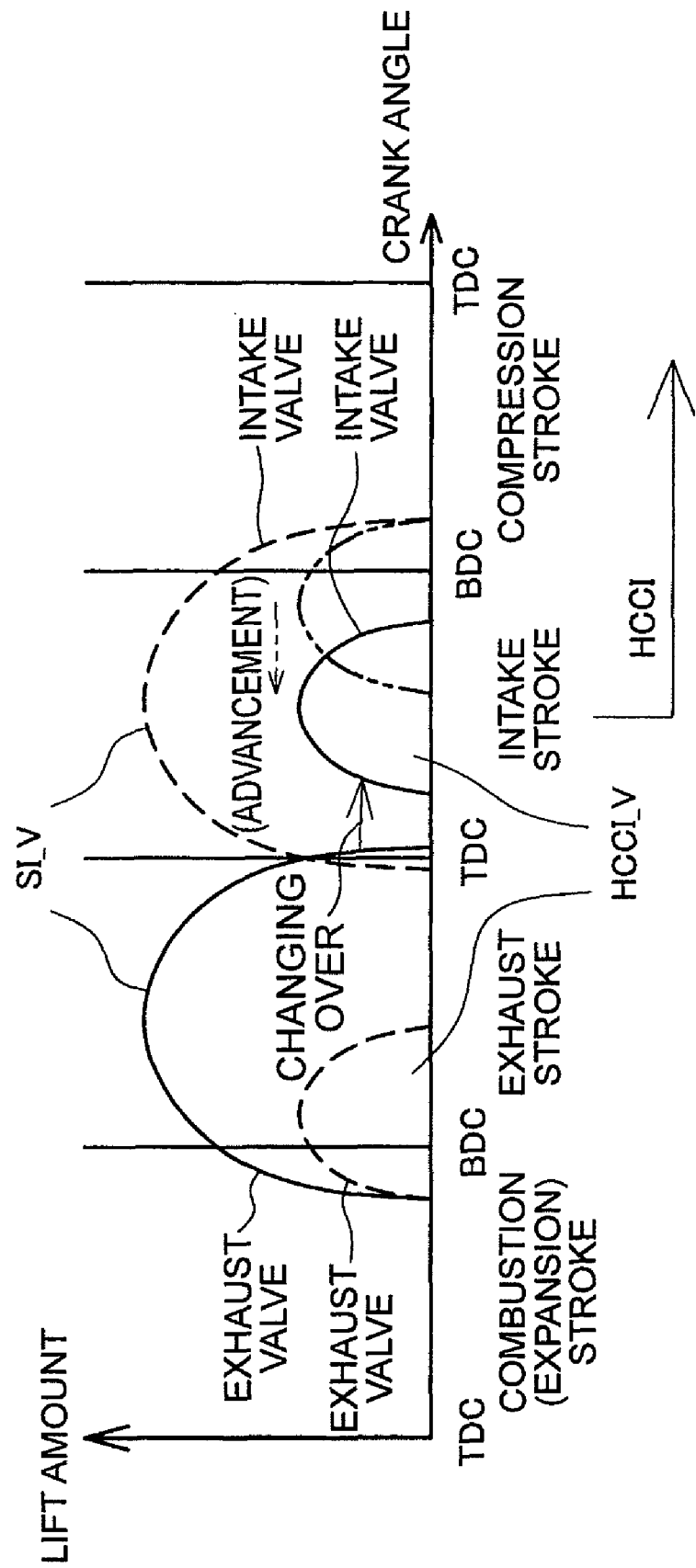
FIG. 5 is a schematic diagram showing valve lift properties in the case of pattern 2 during the change over in the premixed compression ignition type engine of FIG. 1.

FIG. 5 is a schematic diagram showing valve lift properties (amounts and timing) in the second cylinder at the time of the change over in the case of pattern 2. FIG. 5 shows valve lift properties within a combustion cycle in the same cylinder, as in the case of FIG. 4. In the case of pattern 2, it is understood from FIG. 5 that the exhaust valve 12v is opened/closed with valve lift properties for spark ignition combustion before the change over to the low-lift cams, and that the intake valve 11v is opened/closed with valve lift properties for compression ignition combustion immediately after the change over to the low-lift cams.

As shown in FIG. 5, in the case of pattern 2, the cam 11c (variable valve timing mechanism) is controlled such that the valve-opening timing of the intake valve 11v is advanced with respect to the valve-opening timing thereof during steady operation under compression ignition combustion (see long and dashed line segments of FIG. 5) during a change over period from spark ignition combustion to compression ignition combustion, as will be described later in detail.

(Control Method)

Figure 2:
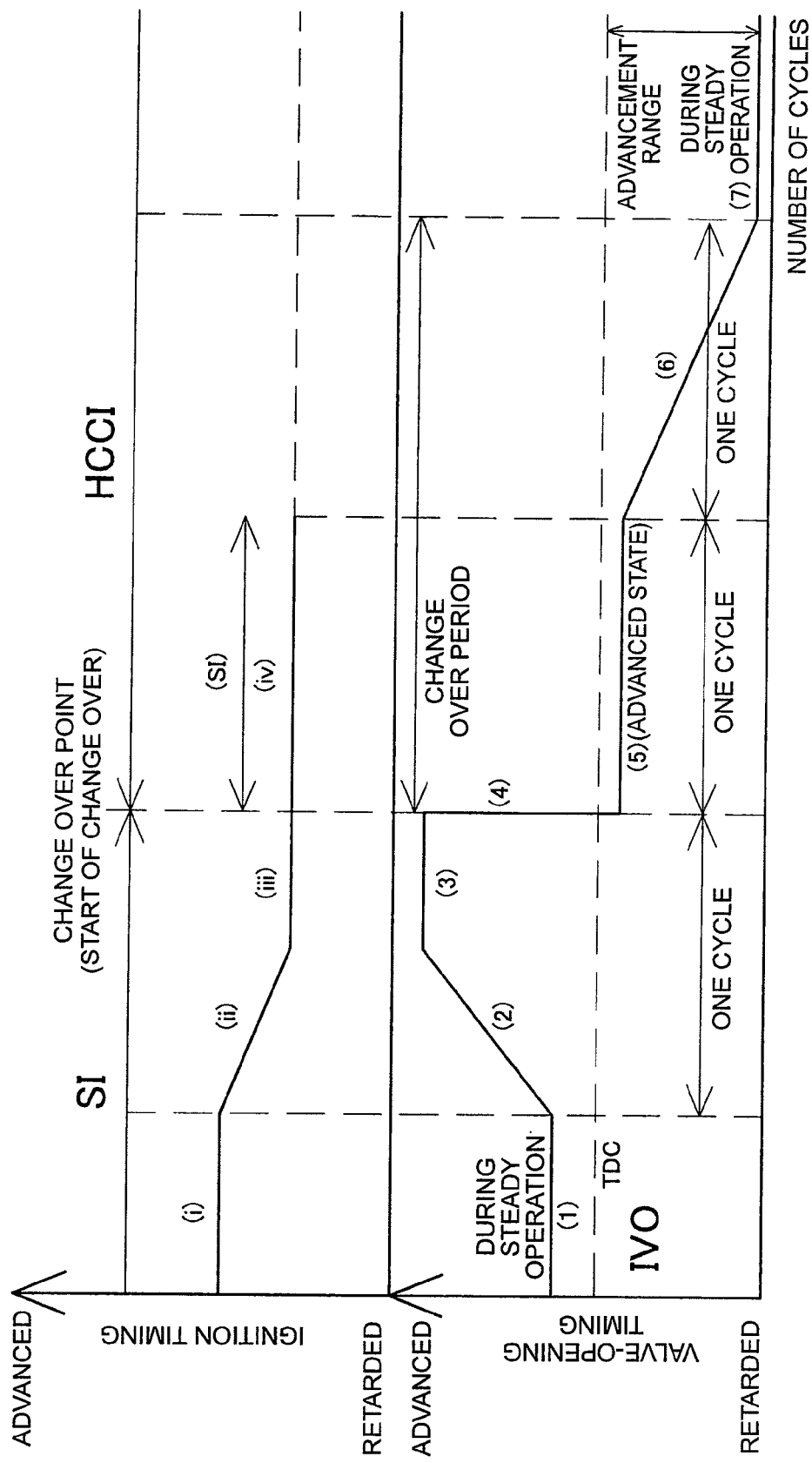
FIG. 2 is a chart showing ignition timing and valve-opening timing of an intake valve in the premixed compression ignition type engine of FIG. 1.

Next, a method of controlling the premixed compression ignition type engine 1 will be described with reference to FIG. 2. The method of controlling the premixed compression ignition type engine 1 will be described herein in the form of the control of the premixed compression ignition type engine 1 by the ECU 5. FIG. 2 is a chart showing the ignition timing of the premixed compression ignition type engine 1 and the valve-opening timing (IVO) of the intake valve 11v in the case of pattern 2. The axis of abscissa of FIG. 2 represents the number of combustion cycles. While the upper part of FIG. 2 illustrates a more advanced state, the lower part of FIG. 2 illustrates a more retarded state. The amounts of advancement and retardation as to each of the ignition timing and the valve-opening timing of the intake valve 11v can be read from FIG. 2 (i.e., FIG. 2 shows that the amounts of advancement and retardation as to each of the ignition timing and the valve-opening timing of the intake valve 11v are controlled independently of each other). The number of cycles represented by the axis of abscissa is common to the ignition timing and the valve-opening timing.

In the case where the intake valve 11v is first changed over after the start of a change over from spark ignition combustion to compression ignition combustion by the variable valve operating mechanism 110 in at least one of the first to the fourth cylinders (i.e., at least one of those cylinders conforms to pattern 2), the ECU 5 performs the control described below. In this case, the ECU 5 is required to discern whether or not at least one of the cylinders has the valve timing according to pattern 2. In this regard, for example, a driver of the engine may transmit to the ECU 5 in advance information that at least one of the cylinders has the valve timing according to pattern 2, using an input device or the like. Alternatively, the ECU 5 may determine whether or not at least one of the cylinders has the valve timing according to pattern 2, based on a value detected by an installed sensor or the like. In the embodiment of the present invention, the second cylinder has the valve timing according to pattern 2, and the ECU 5, which is aware thereof, performs the following control.

(Description on Valve-Opening Timing of Intake Valve)

First of all, the control of the valve-opening timing of the intake valve 11v will be described. During steady operation under spark ignition combustion, the cam 11c (variable valve timing mechanism) is controlled such that the valve-opening timing of the intake valve 11v coincides with a required valve-opening timing (advanced amount) during steady operation under spark ignition combustion (see (1) of FIG. 2).

This control is performed in the same manner even in the case where none of the cylinders has the valve timing according to pattern 2.

Then, in a combustion cycle immediately before the start of a change over from spark ignition combustion to compression ignition combustion, the cam 11c (variable valve timing mechanism) is controlled such that the valve-opening timing of the intake valve 11v is advanced with respect to the valve-opening timing thereof during steady operation under spark ignition combustion (see (2) and (3) of FIG. 2). The valve-opening timing is thus advanced temporarily to a timing before the start of the change over because a later-described operation delay (time lag) causes a problem.

The problem caused by the operation delay will now be described. When a change over signal (to variable valve operating mechanism 110) is sent out from the ECU 5 at a change over point, a change over from the high-lift cam to the low-lift cams is made in each of the aforementioned cams 11c and 12c. For example, in an attempt to make a direct change over (without temporary advancement before the start of the change over) from the valve-opening timing during steady operation under spark ignition combustion (time point indicated by (1) of FIG. 2), the change over needs to be made first to a valve-opening timing during steady operation under compression ignition combustion (time point indicated by (7) of FIG. 2) (by making a change over from the high-lift cam to the low-lift cams with the aid of the variable valve operating mechanism 110), and the valve-opening timing needs to be further advanced to a desired advanced valve-opening timing (time point indicated by (5) of FIG. 2) with the aid of the variable valve timing mechanism. However, due to an operation delay of the variable valve timing mechanism or the like, it takes a long period of time to advance the valve-opening timing from the time point indicated by (7) of FIG. 2 to the time point indicated by (5) of FIG. 2, so the intake air heating effect is produced during this period. Thus, the valve-opening timing of the intake valve 11v is advanced beforehand in one combustion cycle immediately before the start of the change over, so a desired advanced state is directly obtained after the start of the change over (by the variable valve operating mechanism 110). The intake air heating effect produced immediately after the start of the change over can thereby be reduced, as will be described later.

It should be noted herein that the difference between the valve-opening timing (1) during steady operation under spark ignition combustion and the valve-opening timing (3) at the time of maximum advancement before the start of the change over is equal to the difference between the valve-opening timing (7) during steady operation under compression ignition combustion and the valve-opening timing (5) at the time of maximum advancement after the start of the change over. In this manner, the valve-opening timing can be directly shifted to a suitably advanced state under the control of the variable valve timing mechanism immediately after the start of the change over (made by the variable valve operating mechanism 110). As will be described later, this also results from the fact that the change over from the high-lift cam to the low-lift cams is made in an extremely short period of time with the aid of the variable valve operating mechanism 110 (see (4) of FIG. 2). Although this control is performed in the embodiment of the present invention, the present invention should not be limited thereto.

In the embodiment of the present invention, the valve-opening timing of the intake valve 11v is controlled to be advanced (through the operation of the variable valve timing mechanism) within a range provided with the negative overlap period during compression ignition combustion. Therefore, the valve-opening timing of the intake valve 11v is advanced to the position of top dead center (exhaust TDC) at the maximum (see "ADVANCEMENT RANGE" of FIG. 2).

Next, the cam 11c (variable valve operating mechanism 110 and variable valve timing mechanism) is controlled in the change over period from spark ignition combustion to compression ignition combustion such that the valve-opening timing of the intake valve 11v is advanced with respect to the valve-opening timing thereof during steady operation under compression ignition combustion (since intake valve 11v is first changed over after the start of the change over from spark ignition combustion to compression ignition combustion in the second cylinder) (see (5) of FIG. 2 in contraposition to (7) of FIG. 2). More specifically, a change over signal is sent out from the ECU 5 at the change over point, so each of the aforementioned cams 11c and 12c (variable valve operating mechanism 110) is controlled such that a change over from the high-lift cam to the low-lift cams is made (see (4) of FIG. 2).

Owing to the control method described above, even in the case where the change over is made starting from the intake valve 11v in at least one of the cylinders (the second cylinder in the embodiment of the present invention) in the change over period from spark ignition combustion to compression ignition combustion, the valve-opening timing of the intake valve 11v is advanced, so the intake air heating effect produced immediately after the start of the change over can be reduced. As a result, even in the case where the change over from spark ignition combustion to compression ignition combustion is made from the intake valve 11v (in the case of pattern 2), the occurrence of pre ignition or knocking in the change over period can be suppressed.

As described above, the valve-opening timing of the intake valve 11v is advanced with respect to the valve-opening timing thereof during steady operation under spark ignition combustion during spark ignition combustion immediately before the change over to compression ignition combustion (made by the variable valve timing mechanism), so a direct transition to the valve-opening timing that is advanced with respect to the valve-opening timing during steady operation under compression ignition combustion by a predetermined amount is made immediately after the change over (made by the variable valve operating mechanism 110). It should be noted herein that the change over from the high-lift cam to the low-lift cams is made by the variable valve operating mechanism 110 in an extremely short period of time, and that the length of this period required for the change over between the cams is negligible in FIG. 2. Therefore, the valve-opening timing transits substantially vertically downward (toward retardation) as indicated by (4) of FIG. 2. Thus, the intake air heating effect produced immediately after the start of the change over can be reduced efficiently.

Then, the ECU 5 controls the cam 11c (variable valve timing mechanism) so as to start retarding the valve-opening timing of the intake valve 11v after the end of the first combustion cycle following the start of the change over from spark ignition combustion to compression ignition combustion, and to retard the valve-opening timing to the valve-opening timing during steady operation under compression ignition combustion (see (5), (6), and (7) of FIG. 2) Intrinsically, during compression ignition combustion, it is desirable to set the amount of advancement of the timing for closing the exhaust valve from top dead center (TDC) to approximately equal the amount of retardation of the timing for opening the intake valve with a view to improving fuel consumption (so as to reduce pump loss resulting from blow-back of internal EGR). That is, from this point of view, it is better to retard the valve-opening timing of the intake valve 11v and shorten the period in which the valve-opening timing is advanced. On the other hand, in the premixed compression ignition type engine 1, the valve-opening timing of the intake valve 11v is advanced to suppress the occurrence of pre ignition. If the period in which the valve-opening timing is advanced is too long, a deterioration in fuel consumption is caused in accordance with the amount of advancement (due to increase in pump loss). However, if the period in which the valve-opening timing is advanced is too short, the effect of reducing the intake air heating effect cannot be obtained sufficiently. Thus, although the valve-opening timing of the intake valve 11v is advanced by a minimum required period for suppressing the occurrence of pre ignition and then retarded as soon as possible, so the deterioration in fuel consumption can be minimized while the occurrence of pre ignition is suppressed, the present invention is not limited to this control. For example, the retardation of the valve-opening timing may be started upon the end of two cycles after the start of the change over instead of being started upon the end of one cycle after the start of the change over.

The change over to compression ignition combustion is then completed. After that, compression ignition combustion is carried out (see (7) of FIG. 2). As in the case with (1) of FIG. 2, this control is performed in the same manner even in the case where none of the cylinders has the valve timings according to pattern 2.

(Description on Ignition Timing)

Next, the control of the ignition timing of the ignition plug 60c will be described. First of all, the ignition plug 60c is controlled during steady operation under spark ignition combustion such that the ignition timing coincides with a required timing during steady operation under spark ignition combustion (see (i) of FIG. 2). This control is also performed in the same manner even in the case where none of the cylinders has the valve timing according to pattern 2.

Then, in the combustion cycle immediately before the start of a change over from spark ignition combustion to compression ignition combustion in the combustion chamber 10, the ECU 5 controls the ignition plug 60c such that the time point for ignition by the ignition plug 60c is retarded with respect to the ignition timing during steady operation under compression ignition combustion (see (ii) and (iii) of FIG. 2). Thus, the intake air heating effect can be suppressed. Also, the occurrence of pre ignition or knocking can be suppressed more strongly by lowering the in-cylinder temperature. This control may not be performed when the reduction of the intake air heating effect through the advancement control of the valve-opening timing of the intake valve 11v is sufficient.

Then, during the first combustion cycle after the start of the change over from spark ignition combustion to compression ignition combustion in the combustion chamber 10, the ignition plug 60c is controlled so as to carry out ignition (since the second cylinder has the valve timing according to pattern 2) (see (iv) of FIG. 2). Each of the cams has already been changed over at the change over point from the high-lift cam (for spark ignition combustion) to the low-lift cams (for compression ignition combustion), but spark ignition combustion is actually carried out during one combustion cycle after the start of the change over (see the period (iv) of FIG. 2). As described above, the intake air heating effect is reduced under the advancement control of the valve-opening timing of the intake valve 11v. Therefore, if the action of reducing the intake air heating effect is too strong, misfiring may occur in the first combustion cycle immediately after the start of the change over. However, the occurrence of misfiring immediately after the start of the change over can be suppressed by controlling the ignition plug 60c as described above. This control may also not be performed, and ignition may be carried out not only during the first combustion cycle but during the first two combustion cycles (or more combustion cycles) after the start of the change over.

After that, ignition is not carried out by the ignition plug 60c, and the change over to compression ignition combustion is completed.

As described above, the premixed compression ignition type engine 1 is controlled under the aforementioned method of controlling the premixed compression ignition type engine. The premixed compression ignition type engine 1 has a plurality of cylinders having the two different kinds of valve timing (patterns 1 and 2) (having four different kinds of valve timing including at least the two kinds of valve timing). In one of the two kinds of valve timing (pattern 1), the exhaust valve 12v is first changed over after the start of a change over from spark ignition combustion to compression ignition combustion. In the other of the two kinds of valve timing (pattern 2), the intake valve 11v is first changed over after the start of a change over from spark ignition combustion to compression ignition combustion. In the premixed compression ignition type engine 1 having a plurality of cylinders with both patterns, namely, the change over from the exhaust valve 12v and the change over from the intake valve 11v, the occurrence of pre ignition or knocking during the change over period can be suppressed by controlling the ignition timing as described above. The plurality of cylinders may have three or more kinds of valve timing.

In the case of a multi-cylinder engine, the intake valve 11v is usually changed over first after the start of a change over from spark ignition combustion to compression ignition combustion in one of the cylinders (pattern 2). However, in the case where the intake valve 11v is not changed over first after the start of the change over in any one of the cylinders but the change over is made only from the exhaust valve 12v, the intake air heating effect is not produced, so the ECU 5 is not required to perform the above-mentioned advancement control of the valve-opening timing of the intake valve 11v.

(Description of Case where Conventional Control is Performed)

The valve timing in a multi-cylinder engine in the case where conventional control is performed instead of performing the advancement control of the intake valve according to the embodiment of the present invention will now be described. In this multi-cylinder engine as well, the valve timing of the cylinders differ from one another as in the case of the embodiment of the present invention.

Figure 7:
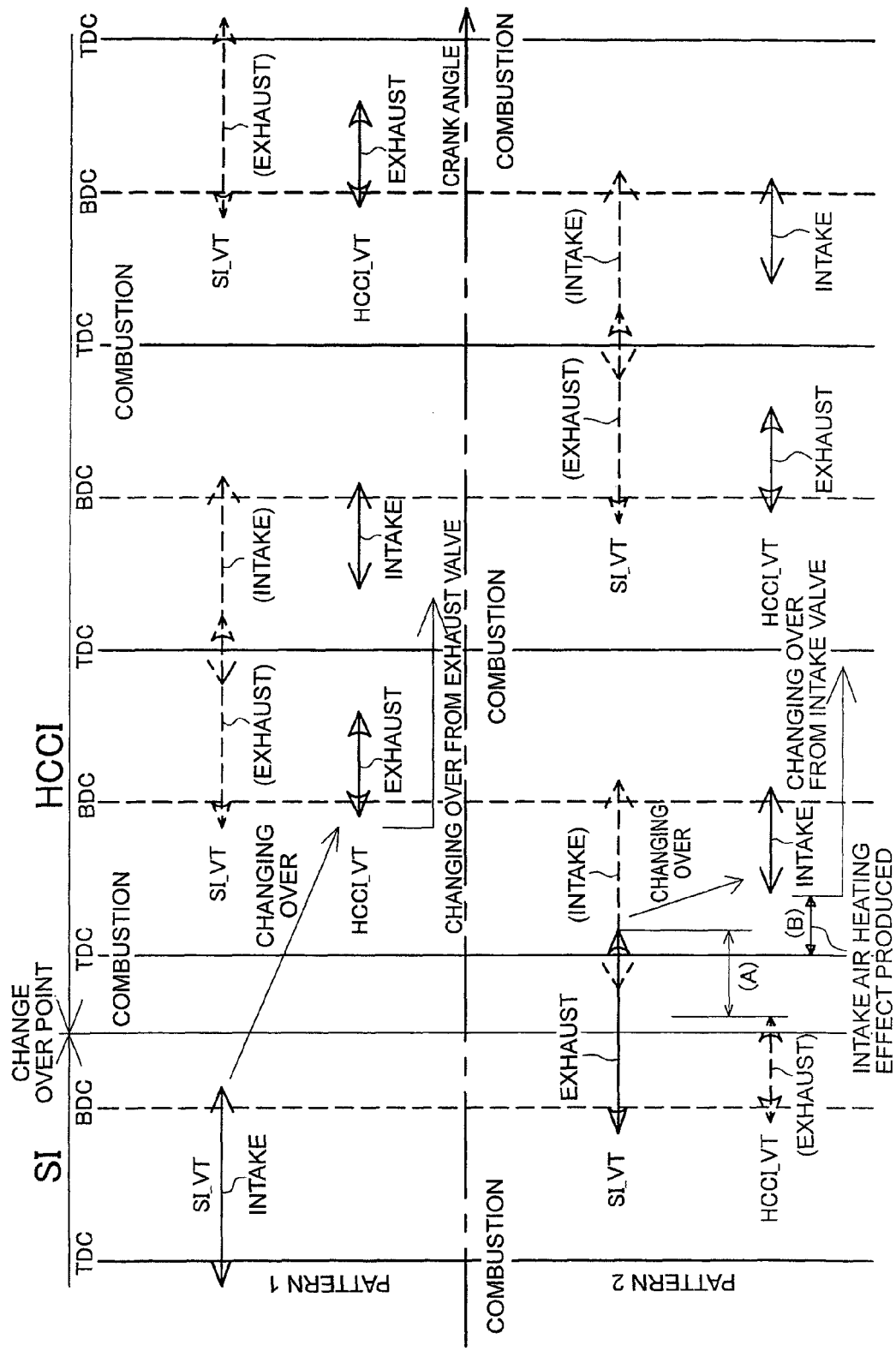
FIG. 7 is a chart showing valve timing according to two patterns, namely, patterns 1 and 2 in a conventional multi-cylinder engine.
Figure 8:
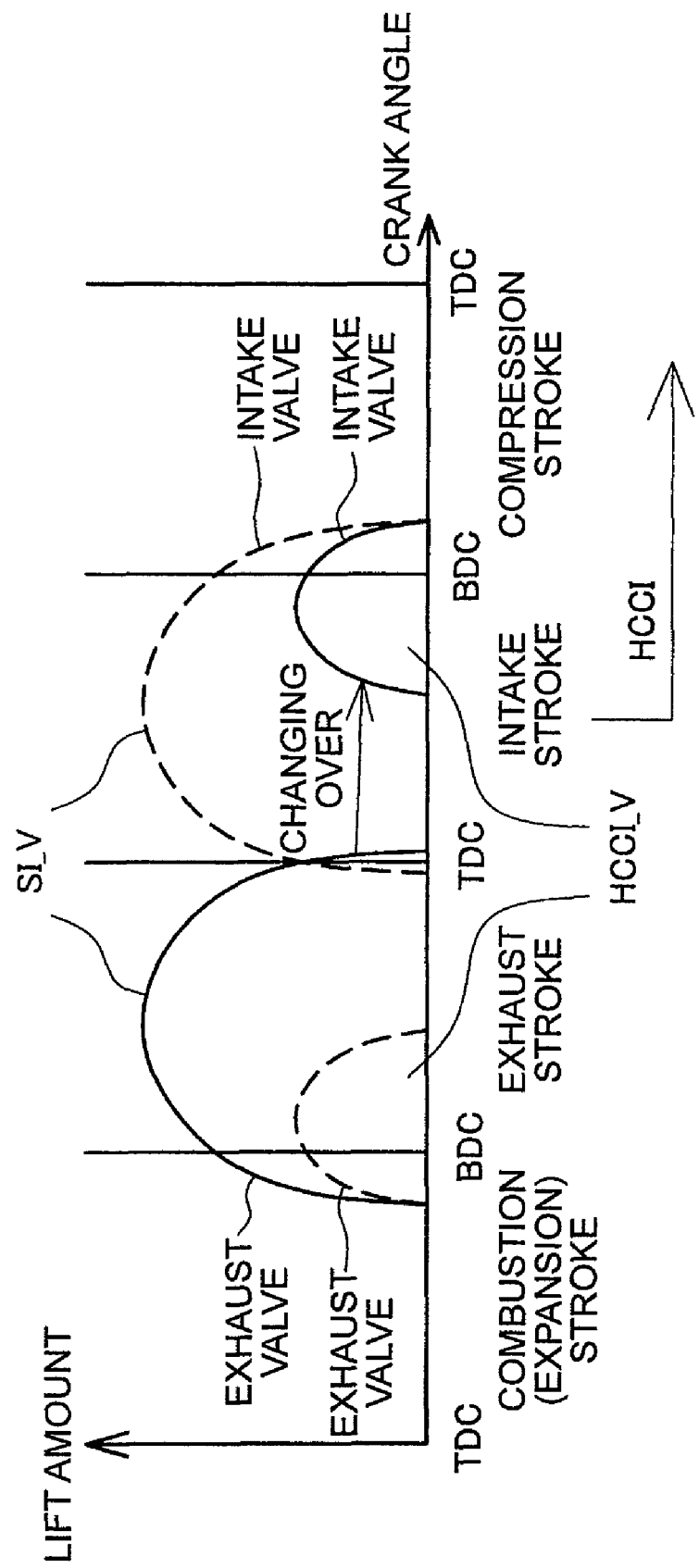
FIG. 8 is a schematic diagram showing valve lift properties in the case of pattern 2 during change over in the conventional multi-cylinder engine.

In the case where the conventional control is performed, the valve timing according to the two kinds of patterns (patterns 1 and 2) in the multi-cylinder engine are illustrated in FIG. 7. The valve lift properties at the time of a change over made in this case according to pattern 2 are illustrated in FIG. 8. As shown in FIG. 8, in the case of pattern 2 (change over from the intake valve), the exhaust valve is opened/closed at the valve timing during steady operation under spark ignition combustion before the change over (between the cams). That is, the exhaust valve operates at the normal valve timing (see solid line of FIG. 8). Then, immediately after the change over (between the cams), the intake valve is opened/closed at the valve timing during steady operation under compression ignition combustion (see the other solid line of FIG. 8). Thus, the intake valve is opened later than during spark ignition combustion (see broken lines of FIG. 8). Therefore, in the case where the control is performed according to the valve lift properties shown in FIG. 8 in that one of the cylinders which has the valve timing according to pattern 2, the intake air heating effect is produced during the change over period.

Figure 9:
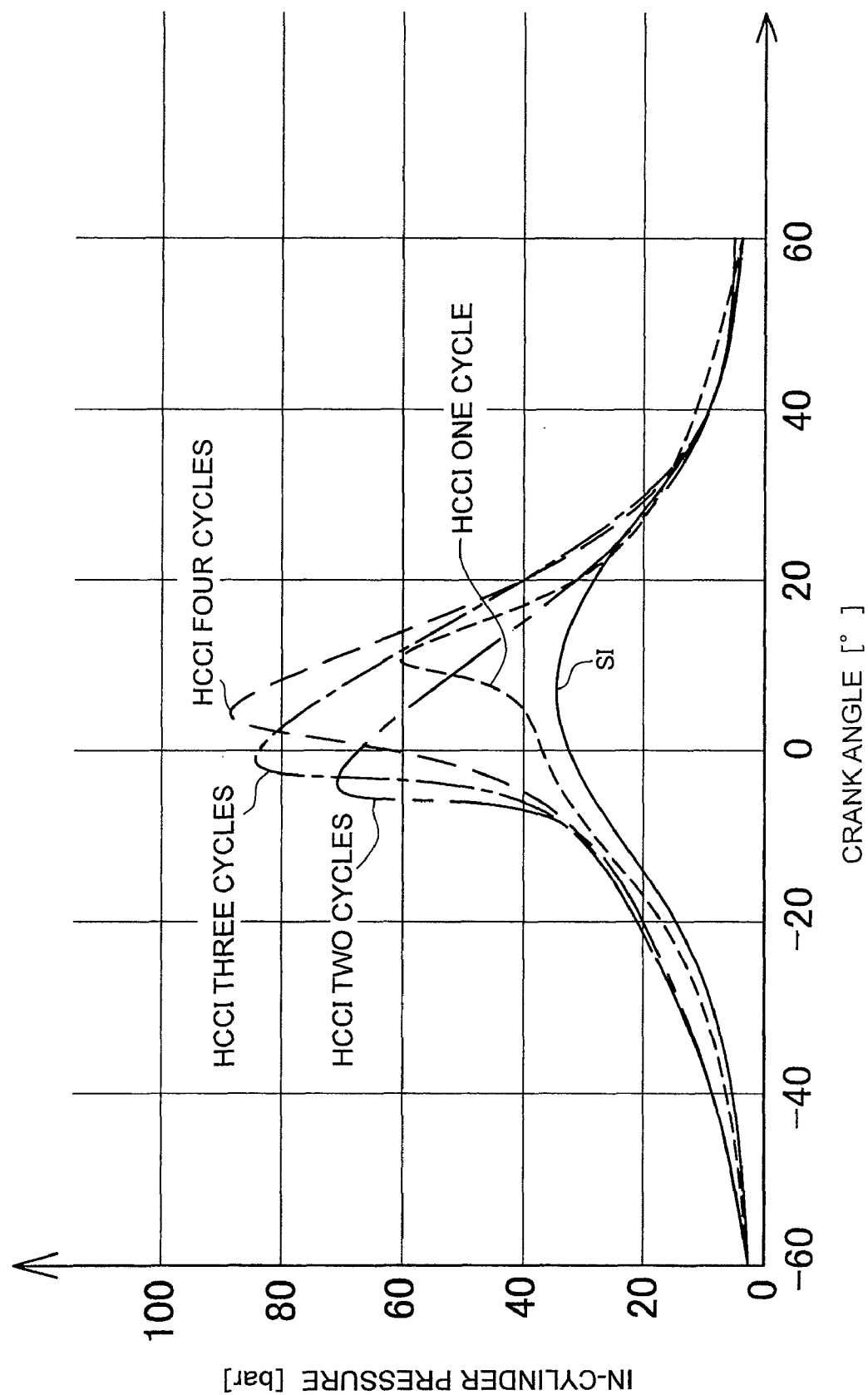
FIG. 9 is a graph showing in-cylinder pressure of the conventional multi-cylinder engine.

The in-cylinder pressure in the case where the conventional control is performed in the cylinder having the valve timing according to pattern 2 as described above is illustrated in FIG. 9. The axis of abscissa of FIG. 9 represents crank angle. A crank angle of 0 degrees corresponds to compression top dead center. As shown in FIG. 9, the in-cylinder pressure in the first cycle during compression ignition combustion (HCCI) is higher than the in-cylinder pressure during spark ignition combustion (SI). The in-cylinder pressure becomes higher as the order of the combustion cycle increases from one to two, three, and four. An increase in internal pressure at a peak position in the neighborhood of compression top dead center is particularly remarkable. FIG. 9 shows that the influence of the intake air heating effect becomes remarkable after the change over from spark ignition combustion to compression ignition combustion. This phenomenon causes the occurrence of pre ignition or knocking.

(Description of Case where Control According to Present Invention is Performed)

FIGS. 3 and 5 each show the valve timing in the case where the above-mentioned advancement control is performed in the premixed compression ignition type engine 1. As shown in each of FIGS. 3 and 5, in the second cylinder having the valve timing according to pattern 2, the valve-opening timing of the intake valve 11v is advanced with respect to the valve-opening timing during steady operation under compression ignition combustion (see the broken line segments of FIG. 3 and the dashed line segments of FIG. 5) during the change over period from spark ignition combustion to compression ignition combustion (see the solid line segments and an arrow (ADVANCEMENT (1)) of FIG. 3 and the solid line segments and an arrow (ADVANCEMENT) of FIG. 5). Thus, the period from the moment when the exhaust valve 12v is closed at the normal valve timing (in the neighborhood of compression top dead center) to the moment when the intake valve 11v is opened can be shortened. Therefore, the intake air heating effect can be reduced (see (C) of FIG. 3) in comparison with the case where the valve-opening timing is not controlled (see (B) of FIG. 7).

As described above, the advancement control by the variable valve timing mechanism has an influence on the valve timing of all the cylinders and also on the valve timing during both spark ignition combustion and compression ignition combustion. As shown in FIG. 2, around the change over period as well, the advancement control of the valve-opening timing of the intake valve 11v is performed. Therefore, among the valve timing of the intake valve shown in FIG. 3, there are other valve timing that are advanced (with respect to the valve timing in the state of steady operation) in addition to those specified by "ADVANCEMENT (1)", "ADVANCEMENT (2)", and "ADVANCEMENT (3)". However, FIG. 3 is a schematic diagram and hence does not specify the other advanced valve timing.

Figure 6:
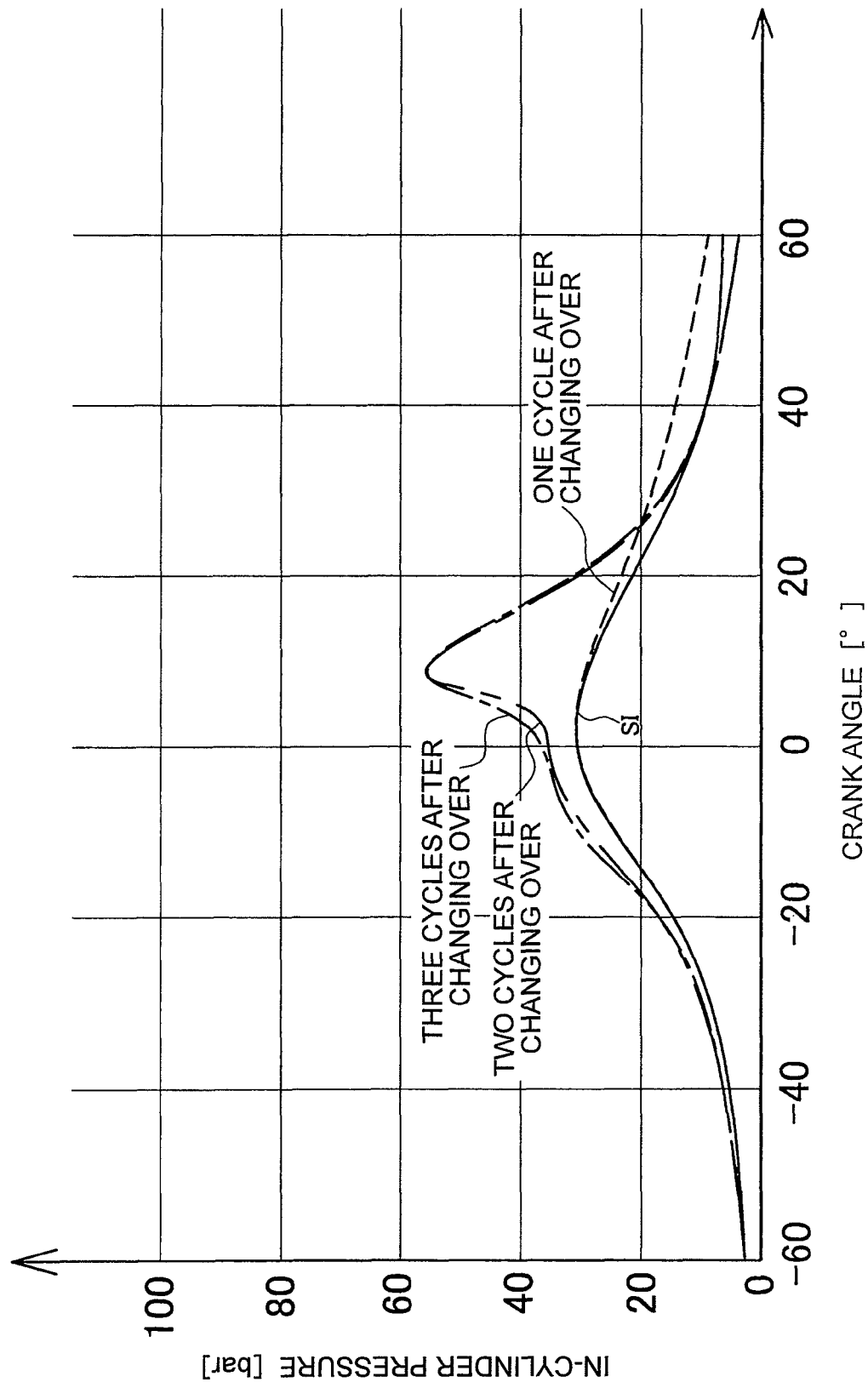
FIG. 6 is a graph showing in-cylinder pressure of the premixed compression ignition type engine of FIG. 1.

FIG. 6 shows the in-cylinder pressure in the second cylinder of the premixed compression ignition type engine 1 during a change over period from spark ignition combustion to compression ignition combustion. The axis of abscissa of FIG. 6 represents crank angle. A crank angle of 0 degrees corresponds to compression top dead center. As shown in FIG. 6, the in-cylinder pressure during spark ignition (SI) combustion is almost equal to the in-cylinder pressure during the first combustion cycle (first cycle) after the start of the change over. This is because compression ignition combustion is barely carried out and ignition is carried out by the ignition plug 60c during the first combustion cycle after the start of the change over (see (iv) of FIG. 2). The in-cylinder pressure during the second cycle or the third cycle after the start of the change over to compression ignition combustion (HCCI) is higher than the in-cylinder pressure during spark ignition combustion and the in-cylinder pressure during the first cycle after the start of the change over, but lower than in the case of FIG. 9 where the valve-opening timing of the intake valve 11v is not controlled to be advanced. More specifically, the maximum in-cylinder pressure is equal to or lower than 60 [bar] at the peak position in the neighborhood of the compression top dead center of FIG. 6, but equal to about 90 [bar] in FIG. 9. Comparison between FIGS. 6 and 9 proves that the in-cylinder pressure decreased more than in the case of FIG. 9. The foregoing description implies that the influence of the intake air heating effect after a change over from spark ignition combustion to compression ignition combustion is weakened, and the occurrence of pre ignition or knocking is suppressed by using the premixed compression ignition type engine 1 according to the present invention and the method of controlling same.

Although the embodiment of the present invention has been described above, the present invention is not limited to the aforementioned embodiment thereof but may be implemented after being subjected to various modifications within the scope defined by the following claims.

For example, if there is no time lag in the operation of the variable valve timing mechanism, the valve-opening timing of the intake valve 11v may be advanced almost simultaneously with a change over instead of being advanced during a cycle preceding the change over.

In making a change over between spark ignition combustion and compression ignition combustion, the timing for opening/closing the valves may also be changed exclusively without making a change over between the cams.

The invention claimed is:

1. A method of controlling a premixed compression ignition type engine having
    at least one cylinder,
    a combustion chamber,
    an intake valve,
    an exhaust valve,
    an intake valve cam for spark ignition combustion,
    an intake valve cam for compression ignition combustion,
    an exhaust valve cam for spark ignition combustion, and
    an exhaust valve cam for compression ignition combustion, and that is operated while changing over between spark ignition combustion and compression ignition combustion by changing over between said cams for spark ignition combustion and said cams for compression ignition combustion, the method comprising:
    performing control to retard valve-opening timing of the intake valve and to advance valve-closing timing of the exhaust valve to set a negative overlap period in which the exhaust valve is closed earlier and the intake valve is opened later with respect to exhaust top dead center during steady operation under the compression ignition combustion;
    performing control to advance valve-closing timing of the exhaust valve after change over from the spark ignition combustion to the compression ignition combustion with respect to the valve-closing timing of the exhaust valve before the change over in the same cylinder; and
    performing control to advance valve-opening timing of the intake valve with respect to the valve-opening timing thereof during steady operation under the compression ignition combustion in the cylinder in which the intake valve is opened by the intake valve cam for compression ignition combustion before the exhaust valve is closed by the exhaust valve cam for compression ignition combustion after start of the change over from the spark ignition combustion to the compression ignition combustion.

2. A method of controlling a premixed compression ignition type engine according to claim 1, wherein the premixed compression ignition type engine further has ignition plug, the method further comprising carrying out ignition through the ignition plug at least during a first combustion cycle after the start of the change over from the spark ignition combustion to the compression ignition combustion in the combustion chamber in the case where the intake valve is opened by the intake valve cam for compression ignition combustion before the exhaust valve is opened/closed by the exhaust valve cam for compression ignition combustion after the start of the change over from the spark ignition combustion to the compression ignition combustion.

3. A method of controlling a premixed compression ignition type engine according to claim 1, wherein the premixed compression ignition type engine further has ignition plug, the method further comprising controlling a timing for ignition by the ignition plug in the combustion chamber such that ignition timing of a combustion cycle immediately before the start of the change over from the spark ignition combustion to the compression ignition combustion is retarded more than ignition timing during steady operation under the spark ignition combustion.

4. A method of controlling a premixed compression ignition type engine according to claim 1, the method further comprising:

starting to retard the valve-opening timing of the intake valve after an end of a first combustion cycle following the start of the change over from the spark ignition combustion to the compression ignition combustion and retarding the valve-opening timing to a valve-opening timing during steady operation under the compression ignition combustion in the cylinder in which the intake valve is opened by the intake valve cam for compression ignition combustion before the exhaust valve is opened/closed by the exhaust valve cam for compression ignition combustion after the start of the change over from the spark ignition combustion to the compression ignition combustion.

5. A method of controlling a premixed compression ignition type engine according to claim 1, the method further comprising:

advancing the valve-opening timing of the intake valve with respect to the valve-opening timing thereof during steady operation under the spark ignition combustion in a combustion cycle immediately before the start of the change over from the spark ignition combustion to the compression ignition combustion in the cylinder in which the intake valve is opened by the intake valve cam for compression ignition combustion before the exhaust valve is opened/closed by the exhaust valve cam for compression ignition combustion after the start of the change over from the spark ignition combustion to the compression ignition combustion.

6. A premixed compression ignition type engine controlled by a method of controlling a premixed compression ignition type engine according to claim 1, the engine comprising a plurality of cylinders including:

the cylinders in which the exhaust valve is opened/closed by the exhaust valve cam for compression ignition combustion before the intake valve is opened/closed by the intake valve cam for compression ignition combustion after the start of the change over from the spark ignition combustion to the compression ignition combustion; and the cylinders in which the intake valve is opened by the intake valve cam for compression ignition combustion before the exhaust valve is opened/closed by the exhaust valve cam for compression ignition combustion after the start of the change over from the spark ignition combustion to the compression ignition combustion.

7. A premixed compression ignition type engine controlled by a method of controlling a premixed compression ignition type engine according to claim 2, the engine comprising a plurality of cylinders including:

the cylinders in which the exhaust valve is opened/closed by the exhaust valve cam for compression ignition combustion before the intake valve is opened/closed by the intake valve cam for compression ignition combustion after the start of the change over from the spark ignition combustion to the compression ignition combustion; and the cylinders in which the intake valve is opened by the intake valve cam for compression ignition combustion before the exhaust valve is opened/closed by the exhaust valve cam for compression ignition combustion after the start of the change over from the spark ignition combustion to the compression ignition combustion.

8. A premixed compression ignition type engine controlled by a method of controlling a premixed compression ignition type engine according to claim 3, the engine comprising a plurality of cylinders including:

the cylinders in which the exhaust valve is opened/closed by the exhaust valve cam for compression ignition combustion before the intake valve is opened/closed by the intake valve cam for compression ignition combustion after the start of the change over from the spark ignition combustion to the compression ignition combustion; and the cylinders in which the intake valve is opened by the intake valve cam for compression ignition combustion before the exhaust valve is opened/closed by the exhaust valve cam for compression ignition combustion after the start of the change over from the spark ignition combustion to the compression ignition combustion.

9. A premixed compression ignition type engine controlled by a method of controlling a premixed compression ignition type engine according to claim 4, the engine comprising a plurality of cylinders including:

the cylinders in which the exhaust valve is opened/closed by the exhaust valve cam for compression ignition combustion before the intake valve is opened/closed by the intake valve cam for compression ignition combustion after the start of the change over from the spark ignition combustion to the compression ignition combustion; and the cylinders in which the intake valve is opened by the intake valve cam for compression ignition combustion before the exhaust valve is opened/closed by the exhaust valve cam for compression ignition combustion after the start of the change over from the spark ignition combustion to the compression ignition combustion.

10. A premixed compression ignition type engine controlled by a method of controlling a premixed compression ignition type engine according to claim 5, the engine comprising a plurality of cylinders including:

the cylinders in which the exhaust valve is opened/closed by the exhaust valve cam for compression ignition combustion before the intake valve is opened/closed by the intake valve cam for compression ignition combustion after the start of the change over from the spark ignition combustion to the compression ignition combustion; and the cylinders in which the intake valve is opened by the intake valve cam for compression ignition combustion before the exhaust valve is opened/closed by the exhaust valve cam for compression ignition combustion after the start of the change over from the spark ignition combustion to the compression ignition combustion.

* * * * *